Sept. 30, 1924.
H. D. HUKILL
BRAKE AND DOOR CONTROL
Filed Jan. 11, 1924
1,509,951
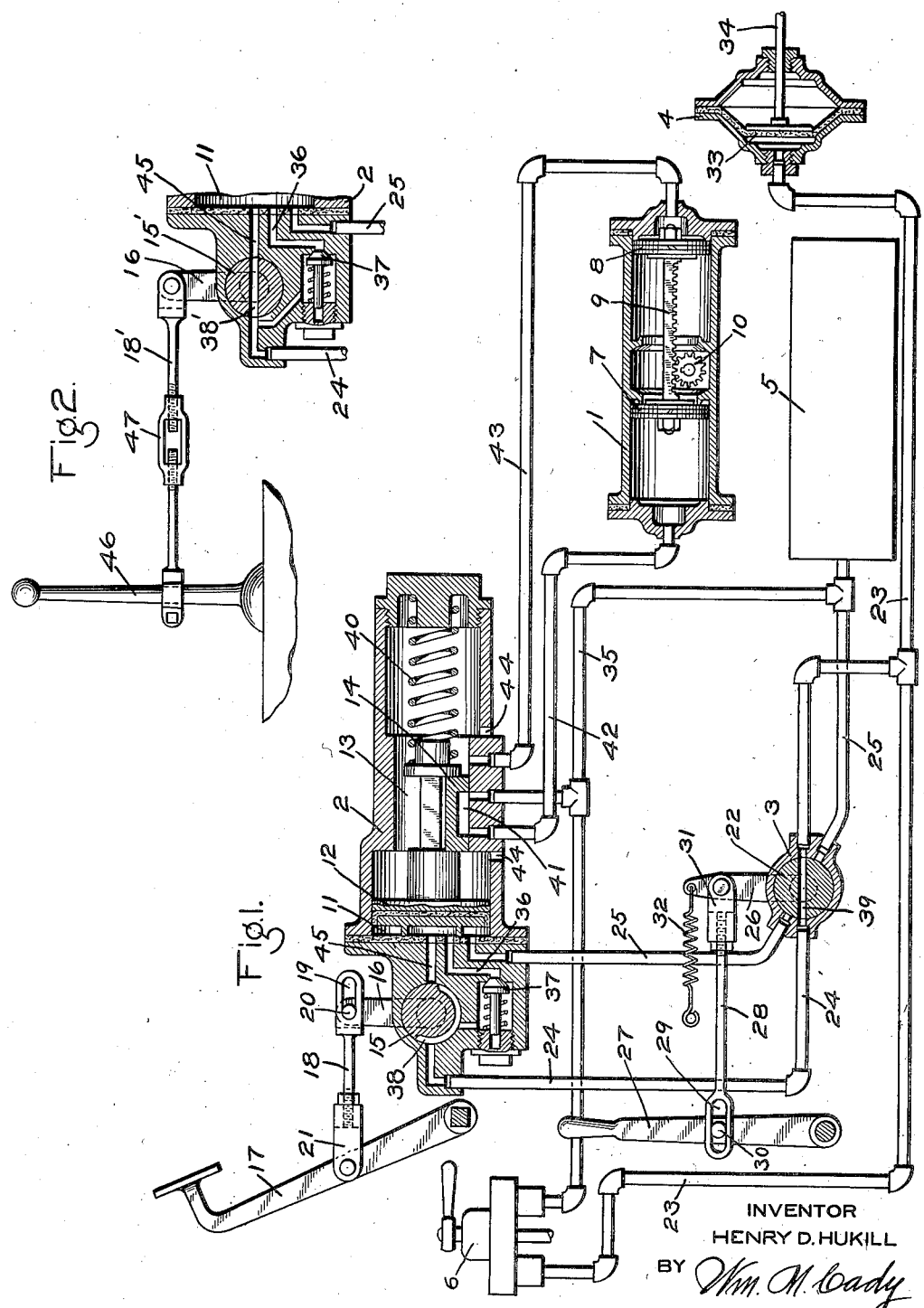
INVENTOR
HENRY D. HUKILL
BY *Wm. M. Cady*
ATTORNEY Patented Sept. 30, 1924.

1,509,951

UNITED STATES PATENT OFFICE.

HENRY D. HUKILL, OF PITTSBURGH, PENNSYLVANIA, ASSIGNOR TO THE WESTING-HOUSE AIR BRAKE COMPANY, OF WILMERDING, PENNSYLVANIA, A CORPORATION OF PENNSYLVANIA.

BRAKE AND DOOR CONTROL.

Application filed January 11, 1924. Serial No. 685,565.

*To all whom it may concern:*

Be it known that I, HENRY D. HUKILL, a citizen of the United States, residing at Pittsburgh, in the county of Allegheny and State of Pennsylvania, have invented new and useful Improvements in Brake and Door Controls, of which the following is a specification.

This invention relates to apparatus for controlling the brakes and the doors, more particularly on passenger buses of the automotive vehicle type.

The principal object of my invention is to provide improved means for controlling the brakes and the doors by which the operation of the doors is interlocked with the operation of the brakes.

In the accompanying drawing; Fig. 1 is a diagrammatic view, partly in section, of a brake and door controlling apparatus embodying my invention; and Fig. 2 a view illustrating a slight modification of my invention.

As shown in Fig. 1 of the drawing, the brake and door controlling apparatus may comprise a pneumatic door engine 1, a door controlling valve device 2, an auxiliary door controlling valve 3, a brake chamber 4, a reservoir 5, and a brake valve device 6.

The door engine 1 may comprise a casing containing pistons 7 and 8 connected by a rack rod 9. A pinion 10 meshing with the rack rod 9 is operatively connected to the doors so that the rotation of the pinion operates to open and close the doors.

The door controlling valve device 2 may comprise a casing having a piston chamber 11 containing a piston 12 and a valve chamber 13 containing a slide valve 14 adapted to be operated by piston 12. A valve 15 controls the admission and release of fluid under pressure to and from the piston chamber 11 and said valve is provided with an operating lever 16.

According to the construction shown in Fig. 1, the lever 16 is operatively connected to the usual engine clutch lever 17 through a link 18 having a forked end with extended slots 19 for receiving a pin 20 carried by the lever 16. The other end of the link is provided with a yoke 21 pivotally connected to the lever 17 and having an adjustable screw-threaded connection with the link 18, so that the length of the link may be adjusted.

The auxiliary valve device 3 may comprise a casing containing a valve 22 for opening communication from the brake chamber pipe 23 through pipe 24 to the valve 15 in one position and from the fluid pressure reservoir 5 through pipe 25 to piston chamber 11 in another position.

The valve 23 is provided with an operating lever 26 which is operatively connected to the usual hand brake lever 27 through a link 28 having a forked end provided with elongated slots 29 for receiving a pin 30 carried by the lever 27. The other end of the link 28 is provided with a yoke 31 pivotally connected to the lever 26 and having an adjustable screw-threaded connection with the link 28. A coil spring 32 is connected with the lever 26 and tends to maintain the valve 22 in the position establishing communication through pipe 24.

The brake valve device 6 may be of any suitable design adapted to control the admission of fluid under pressure to and its release from the brake chamber 4. The brake chamber 4 may comprise flanged casing members having an interposed flexible diaphragm 33 adapted to operate a rod 34 for applying the brakes on the vehicle.

In operation, with the clutch lever 17 in its "in" position, as shown in the drawing, and the brakes released, the piston chamber 11 will be at atmospheric pressure, since said chamber is open to the brake chamber pipe 23 through a by-pass passage 36, containing a non-return check valve 37, port 38 in valve 15, and pipe 24, communication through pipe 24 being established through a port 39 in the valve 22. The spring 40 then acts on piston 12 to maintain said piston and slide valve 14 in the position shown in the drawing. In this position, a cavity 41 in slide valve 14 connects reservoir pipe 35 with pipe 42, leading to the piston chamber of the piston 7 of the door engine 1, so that fluid under pressure is supplied to the piston 7. Pipe 43, leading to the piston chamber of the piston 8 is now open to valve chamber 13, and since said valve chamber is open to the atmosphere through port 44, the piston 8 will be subject to atmospheric pressure and the pistons 7 and 8 will assume the positions shown in the drawing. In this position the door engine operates to close the car doors.

If it is desired to stop the car, the lever 17 is operated to disengage the engine clutch and the brake valve 6 is operated to apply the brakes. With automatic clutches, the clutch is completely disengaged before the clutch lever is depressed to its full extent, and in order to prevent operation of valve 15 until the clutch is fully disengaged, the elongated slot 19 is provided, so that during the movement of the clutch lever 17, necessary to fully disengage the clutch, the pin 20 will merely ride in the slot 19. A further movement of the clutch lever 17 after the clutch has been fully disengaged, will cause the link 18 to operate the valve 15 so as to connect passage 45 leading to piston chamber 11 with pipe 24.

If the brakes have been applied by operation of the brake valve 6, then fluid pressure from the brake chamber pipe 23 will be supplied to piston chamber 11 and the piston 12 will then be operated to shift the slide valve 14 to its door open position, in which cavity 41 connects the door opening pipe 43 with the fluid pressure supply pipe 35, while the door closing pipe 42 is connected to valve chamber 13 and the atmosphere.

The pistons 7 and 8 will then be shifted to the door opening position so as to open the car doors.

It will be evident that with the above described construction, the doors will not be opened unless the brakes are applied and unless the engine clutch is fully disengaged.

After the doors have been opened, the operator may remove his foot from the clutch lever, without affecting the doors, since the fluid pressure supplied to piston chamber 11 will remain therein, so long as the brakes remain applied, except for possible leakage.

When the brake valve 6 is manipulated to release the brakes, fluid under pressure will also be released from piston chamber 11 by way of the by-pass passage 36, regardless of the position of the clutch lever 17 and the valve 15, so that the piston 12 will be shifted by spring 40 to the door closing position, to effect the closing of the car doors. It will thus be evident that the closing of the car doors is ensured before the car can be started, since the car cannot be started unless the brakes are released.

It will also be noted that the operation of controlling the car doors requires no additional operations by the driver other than those necessary to the usual starting and stopping.

In order to provide for opening the doors in case of an emergency, I employ the auxiliary valve device 3 which is preferably connected to the hand brake lever 27, so that even in emergency, it is necessary to apply the brakes in order to open the car doors.

When the hand brake lever 27 is pulled toward the right to apply the brakes mechanically in the usual manner, the link 28 operates the lever 26 so as to turn the valve 22 to a position in which port 39 establishes communication through pipe 25. Fluid under pressure is thereupon supplied from the reservoir 5 directly to piston chamber 11, so that the piston 12 and slide valve 14 are shifted to the door opening position to effect the opening of the car doors.

As the fluid pressure brake is not in operation in this case, it is necessary to close communication from pipe 24 to the brake chamber pipe 23 in order to prevent escape of fluid from the piston chamber 11 by way of by-pass 36 and pipe 24 and therefore the valve 22 is arranged to control communication through the pipe 24, so that said communication is cut off when the hand brake lever 27 is operated to turn the valve 22.

The above arrangement may also be employed to hold the doors open when the operator wishes to leave his position, since by pulling the hand lever 27 to the brake applied position the connection will be made through the valve 22 for maintaining the fluid pressure on piston 12.

By providing the slot 29 in the end of the link 28, it requires that the hand brakes be applied with ample force to hold the car, before the lost motion due to the slot is taken up to permit the movement of the valve 22 to effect the opening of the car doors.

Instead of interlocking the control of the car doors with the operation of the clutch lever, the control of the car doors may be interlocked with the gear shift lever 46 as shown in Fig. 2. In this case, a link 18' connects the gear shift lever 46 with the lever 16 for operating the valve 15', said link having an interposed turnbuckle 47 by which the length of the link may be adjusted.

In the neutral position of the gear shift lever, as shown in the drawing, the valve 15' is held in a position in which the port 38' establishes communication from pipe 24 to the piston chamber 11, and when the gear shift lever is thrown in either direction to connect the gears in the usual manner, the valve 15' will be turned, so as to cut off communication from pipe 24 to piston chamber 11.

It will thus be seen that with this construction, the doors cannot be opened, even if the brakes are applied, until the gear shift lever 46 has been shifted to neutral position.

Having now described my invention, what I claim as new and desire to secure by Letters Patent, is:—

1. In a vehicle brake and door controlling mechanism, the combination with a fluid pressure brake and means operated by fluid under pressure supplied in operating the brakes for controlling a vehicle door, of manually controlled means for controlling communication through which fluid is supplied to said door controlling means.

2. In a vehicle brake and door controlling mechanism, the combination with a fluid pressure brake and means operated by fluid under pressure for controlling a vehicle door, of a clutch controlling lever and valve means operated by said lever for controlling communication for supplying fluid under pressure from said fluid pressure brake to said door controlling means.

3. In a vehicle brake and door controlling mechanism, the combination with a fluid pressure brake and means operated by fluid under pressure supplied in applying the brakes for controlling a vehicle door, of a clutch controlling lever and valve means operated by said lever for controlling communication through which fluid under pressure is supplied to said door controlling means.

4. In a vehicle brake and door controlling mechanism, the combination with means operated by fluid under pressure for controlling a vehicle door, of a fluid pressure brake, a clutch controlling means, and means operated upon throwing out the clutch for supplying fluid in applying the brakes to said door controlling means.

5. In a vehicle brake and door controlling mechanism, the combination with a fluid pressure brake and means operated by fluid pressure in applying the brakes for controlling a vehicle door, of a vehicle control lever and means operated upon movement of said lever from one position to another for opening communication through which fluid is supplied to said door controlling means.

6. In a vehicle brake and door controlling mechanism, the combination with a fluid pressure brake and means operated by fluid pressure in applying the brakes for effecting the opening of a vehicle door, of a clutch controlling lever and means operated upon movement of said lever to throw out the clutch for opening communication through which fluid is supplied to said door controlling means.

7. In a vehicle brake and door controlling mechanism, the combination with a fluid pressure brake and means operated by fluid under pressure supplied to apply the brakes for effecting the opening of a vehicle door, of a manually operated lever, valve means operated upon movement of said lever for opening communication through which fluid is supplied to said door controlling means, and means for permitting the release of fluid from said door controlling means when the brakes are released, regardless of the position of said lever.

8. In a vehicle brake and door controlling mechanism, the combination with means operated by fluid under pressure for controlling a vehicle door, of a clutch controlling lever and a valve operated by said lever upon a relative movement of the lever to effect the throwing out of the clutch for establishing communication for supplying fluid to said door controlling means.

9. In a vehicle brake and door controlling mechanism, the combination with means operated by fluid under pressure for controlling a vehicle door, of a clutch controlling lever and a valve operated by the movement of said lever for establishing communication through which fluid is supplied to said door controlling means, an always open one way passage being provided through which fluid is released from said door controlling means regardless of the position of said lever.

10. In a vehicle brake and door controlling mechanism, the combination with a fluid pressure brake and a clutch controlling lever, of means operated only upon applying the brakes and with the clutch lever operated to disengage the clutch, for effecting the opening of a vehicle door.

11. In a vehicle brake and door controlling mechanism, the combination with a fluid pressure brake and means operated by fluid under pressure supplied in applying the fluid pressure brakes for controlling a vehicle door, of a mechanical brake and means operated upon applying the mechanical brake for also supplying fluid to said door controlling means.

12. In a vehicle brake and door controlling mechanism, the combination with a fluid pressure brake and means operated by fluid under pressure supplied in applying the fluid pressure brakes for effecting the opening of a vehicle door, of a manually operated lever for controlling a mechanical brake and means operated upon movement of said lever to apply the mechanical brake for also supplying fluid to said door controlling means.

13. In a vehicle brake and door controlling mechanism, the combination with a fluid pressure brake, means operated by fluid under pressure for effecting the opening of a vehicle door, a clutch controlling lever, and means operated by said lever for opening communication through which fluid is supplied to said door controlling means, of a hand brake lever and means operated by said hand brake lever in applying the brakes for also supplying fluid to said door controlling means.

14. In a vehicle brake and door controlling mechanism, the combination with a fluid pressure brake, means operated by fluid under pressure for effecting the opening of a vehicle door, a clutch controlling lever, and means operated by said lever for opening communication through which fluid is supplied to said door controlling means, of a brake lever and means operated by said hand brake lever in applying the brakes for supplying fluid to said door controlling means and at the same time closing communication through which fluid under pressure is supplied from the fluid pressure brake to said clutch lever controlled means.

In testimony whereof I have hereunto set my hand.

HENRY D. HUKILL.